(No Model.)
T. J. MITCHELL.
SICKLE HEAD FOR MOWERS.
No. 502,129. Patented July 25, 1893.
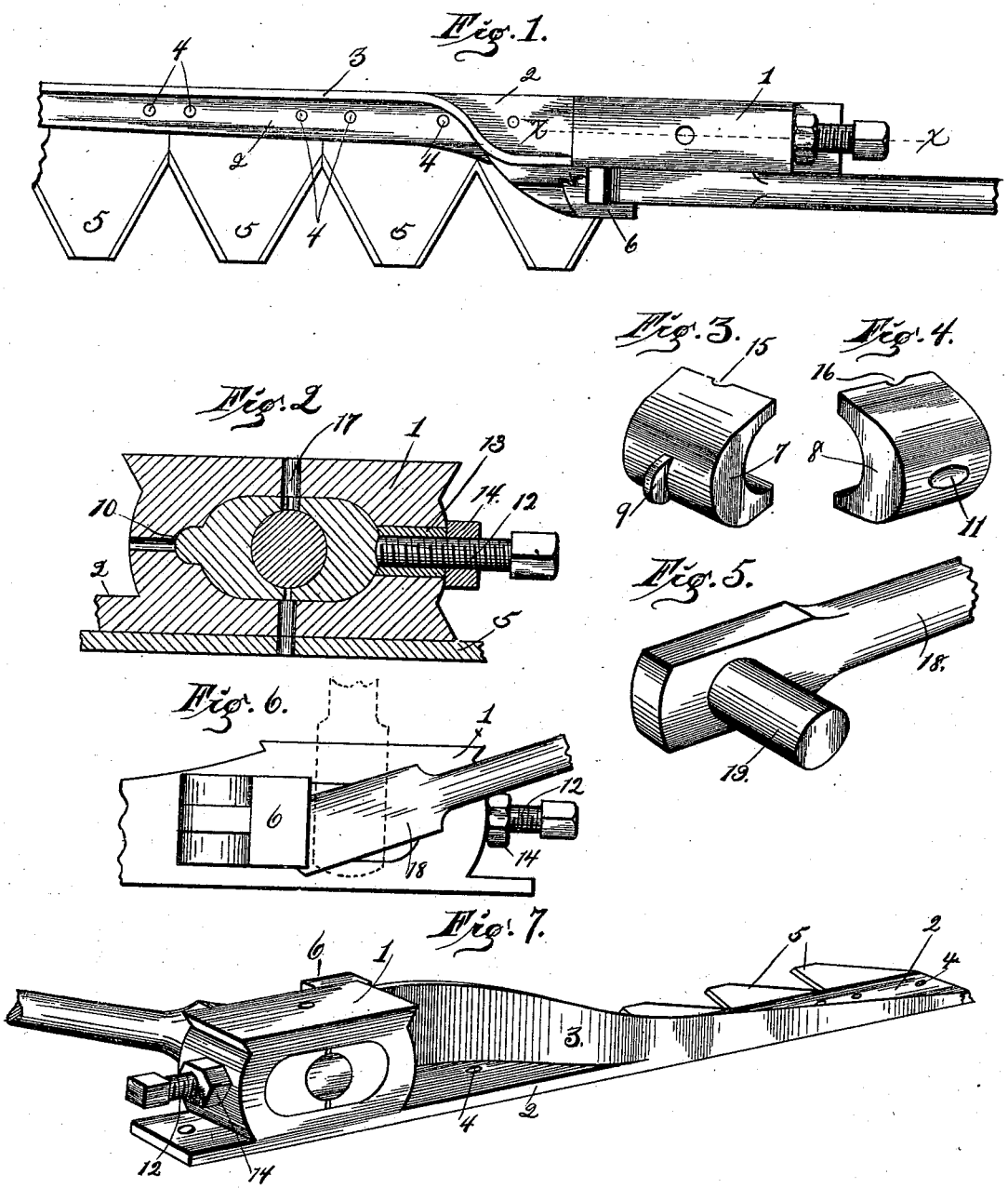
Witnesses:—
U. P. Smith.
Maud Fitzpatrick.
Inventor:—
Thomas J. Mitchell.
By Higdon & Higdon
Atty's.

UNITED STATES PATENT OFFICE.

THOMAS J. MITCHELL, OF VINITA, INDIAN TERRITORY

SICKLE-HEAD FOR MOWERS.

SPECIFICATION forming part of Letters Patent No. 502,129, dated July 25, 1893.

Application filed November 14, 1892. Serial No. 451,861. (No model.)

*To all whom it may concern:*

Be it known that I, THOMAS J. MITCHELL, of Vinita, Cherokee Nation, Indian Territory, have invented certain new and useful Improvements in Sickle-Heads for Mowers, &c., of which the following is a full, clear, and exact description, reference being had to the accompanying drawings, forming a part hereof.

My invention relates to improvements in the connection between pitmen and sickle or cutter bars of mowing and reaping machines, and has for its object the simplifying and lessening of the number of parts in said connection.

A further object of my invention is to provide an adjustable bearing for the pivot pin of a pitman rod, thus obviating any lost motion arising from the wearing of the said pivot pin.

To the above purposes, my invention consists in certain new and novel features of construction and arrangement, as will be hereinafter described and claimed.

That my invention may be fully understood, I will proceed to describe it with reference to the accompanying drawings, in which—

Figure 1. is a plan view of my improved bearing block in position on the sickle bar and with the pitman rod connected. Fig. 2, is a vertical sectional view of the block, taken on the line X—X of Fig. 1. Fig. 3. is a detail perspective view of one of the mating parts of the bearing for the pivot pin of the pitman. Fig. 4. is a like view of the other mating part, which may properly be termed the follower. Fig. 5. is a view of the pitman head and pivot pin. Fig. 6. is a front view of my improved bearing block, showing the pitman in the ordinary position, and the dotted lines showing the position it assumes when being introduced into or removed from the bearing block. Fig. 7. is a perspective view of my device, as it ordinarily appears.

Similar numerals refer to similar parts throughout the several views.

The numeral 1 designates the bearing block, which has an extension 2, which is provided with a strengthening flange 3. This extension 2 is fastened by rivets 4 or in any other suitable manner to the sickle, 5. On the front face of the bearing block, and at a point where the flange joins said block, is formed a retaining clip 6, the object of which is to retain the pitman head in position.

In the center of the bearing block 1 is formed an elongated opening or slot in which fit the two mating bearings 7 and 8. These bearings are concavo-convex in their cross-section; the concave lines being semi-circles; thus when the parts are in position in the bearing block a true circle is formed, into which the pivot of the pitman rod plays. The ends of the slot are curved to conform to the convex sides of the bearings 7 and 8. The mating part 7 has a rearwardly extending lug 9 which fits into a recess 10 in the block 1, to prevent any lateral movement of the bearing 7. The mating part 8, which acts as a follower, is provided in its rear central portion with a slight cavity or recess 11, in which the end of the set screw 12 rests. This set screw 12 runs in an internally screw threaded bearing 13, which is set in the block 1, and on said set screw is a lock nut 14. The mating parts 7 and 8 have semicircular portions 15 and 16 cut from their upper front portions, which, when they are in position, register with a circular aperture 17 in the bearing block 1, and thus serve for the purpose of introducing oil.

The pitman rod is designated by the numeral 18 and the pivot pin by 19.

In putting my device together the part 7 is first placed in position in the opening or slot in the bearing block, with the lug 9 fitting snugly in the recess 10. The part 8 is next placed in position, the set screw being drawn back a slight distance. By now elevating the sickle bar to nearly a vertical position, the pivot pin 19 of the pitman rod 18 can be introduced. As the sickle bar is lowered to its proper position the pitman head will pass behind the retaining clip 6 and thus be held against the bearing block and in position by said clip. The set screw 12 is now moved forward until, pressing against the part 8, the proper adjustment is reached. It can now be locked by the lock nut 14.

As is well known, in the usage of mowers and reapers the pivot pin of the pitman, and the bearing blocks become worn, thereby causing lost motion and "pounding," which very often results in the breaking of either the pitman rod or sickle head. These difficulties are entirely overcome by my invention, for as soon as any wear, or lost motion is noticed the operator, by removing the pivot pin and the mating parts, can grind or file off the front edges of said parts, replace them, introduce the pivot pin of the pitman head, and tighten the set screw; thus quickly and easily overcoming what would otherwise entail expense and loss of time and labor. Thus will be seen the advantages gained by my invention.

Having thus described my invention, what I claim as new and useful, and desire to secure by Letters Patent, is—

In a connection between the sickle bar and pitman-head of a reaper, the combination of a bearing-block having an elongated opening and a cavity communicating with said elongated opening, an extension at one end of said block, a retaining clip formed on one side of said block, two mating bearings adapted to fit in the elongated opening, one of said bearings being held stationary by means of a lug engaging the cavity in the bearing block, the other mating-bearing being capable of longitudinal adjustment, a set-screw, a locking nut, said screw passing through the end of said bearing-block and engaging against the said mating-bearing, a pitman-head and a pivot-pin, all arranged as described and for the purpose set forth.

In testimony whereof I affix my signature in the presence of two witnesses.

THOMAS J. MITCHELL.

Witnesses:
JOSEPH HUNT,
DAVIS HILL.